May 26, 1970  E. W. BRINKMAN  3,514,116

EXPANDING COLLET

Filed Jan. 19, 1968

INVENTOR
EARL W. BRINKMAN

BY *B. Schlesinger*
ATTORNEY

United States Patent Office 3,514,116
Patented May 26, 1970

3,514,116
EXPANDING COLLET
Earl W. Brinkman, Rochester, N.Y., assignor to Davenport Machine Tool Company, Inc., Rochester, N.Y., a corporation of New York
Filed Jan. 19, 1968, Ser. No. 699,185
Int. Cl. B23b 31/14
U.S. Cl. 279—2     3 Claims

ABSTRACT OF THE DISCLOSURE

The split collet has a plurality of radially flexible jaws normally equi-spaced radially from the collet axis a distance sightly less than the radius of the bore of the workpiece that is to be chucked, whereby the latter may be inserted over the jaws when the collet is motionless. When the collet is rotated, centrifugal force causes the jaws to move radially outwardly against the bore wall of the workpiece to grip the workpiece. A ring disposable over the jaws limits their outward movement.

---

This invention relates to collets, and more particularly to a split collet for chucking a workpiece on the arbor or spindle of a machine tool.

The usual split collet is shiftable axially in opposite directions, respectively, to grip and release a workpiece. This in some cases requires a substantial axial movement, depending on the taper of the gripping surfaces of the collet jaws, and, in any event, requires a drawbar or the like, and a drawbar actuating means to effect chucking or release of the workpiece.

One object of this invention is to provide a split collet which will operate faster to grip or release than the usual axially-movable collet.

Another object of this invention is to provide a split collet, which is substantially simpler in construction, and less expensive to manufacture, than conventional collets.

A further object of this invention is to eliminate the need for drawbars for operating split collets.

Other objects of the invention will be apparent hereinafter from the specification and from the recital of the appended claims, particularly when read in conjunction with the accompanying drawing.

Figure 1:
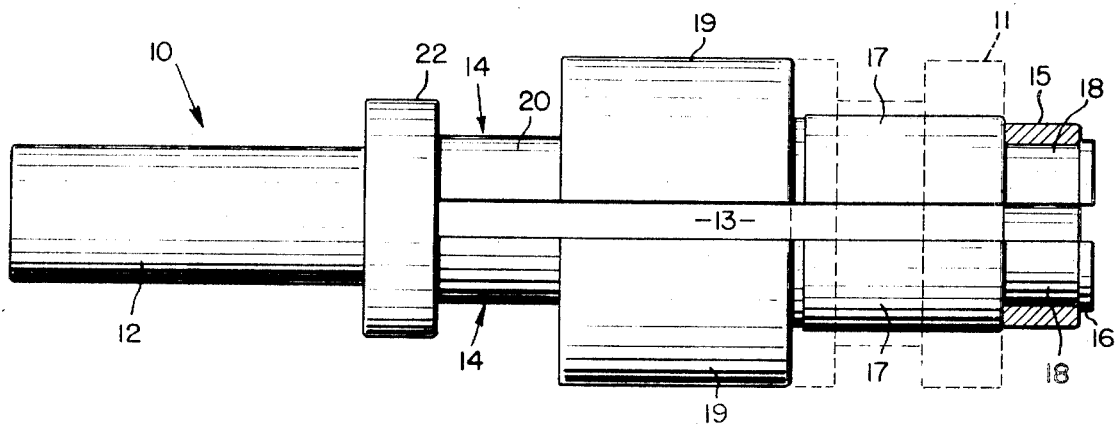
FIG. 1 is a side elevation of a split collet made in accordance with one embodiment of this invention, the retaining ring of the collet being cut away and shown in section, and a workpiece being shown thereon in phantom by broken lines.
Figure 2:
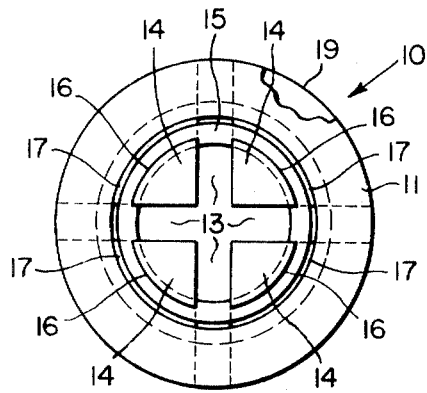
FIG. 2 is an end view of this collet, looking at the right end thereof in FIG. 1, and illustrating the workpiece in solid lines.
Figure 3:
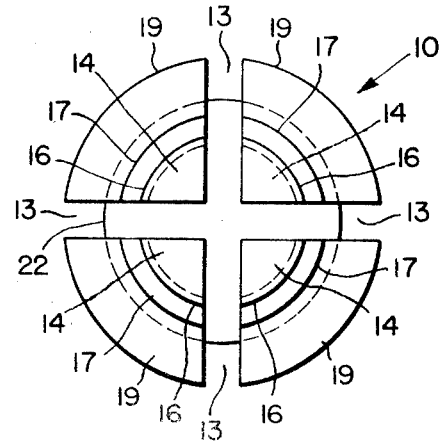
FIG. 3 is an end view similar to FIG. 2, but with the workpiece and retaining ring removed.

Referring now to the drawing by numerals of reference, 10 denotes a split collet having a solid, cylindrical shank 12, and two axially extending, diametral slots 13 which intersect one another at right angles to form the four jaws 14 of the collet. The jaws have radially protruding lips 16 at their front ends, portions 18 of reduced diameter behind the lips, portions 17 of enlarged diameter behind the portions 18, portions 19 of still further enlarged diameter behind the portions 17, and portions 20 of reduced diameter behind the portions 19 and extending to a shoulder portion 22 on the shank.

A ring or collar 15 is normally loosely mounted over the jaws 14 adjacent the front or outer ends thereof to protect the jaws. This collar 15 is held on the jaws 14 by the arcuate lips 16 and by the arcuately shaped portions 17. The enlarged diameter cylindrical shoulder 22 limits the extent to which the shank 12 of the collet can be inserted into the spindle of the machine on which the collet is to be mounted.

Normally the coaxially disposed arcuate surfaces of shoulders 17 are equi-spaced radially from the collet axis a distance slightly less than the radius of the bore of the workpiece 11 to be chucked so that normally there is a slight radial clearance between the bore of the work and peripheral surfaces of the shoulders 17. This permits the work to be moved readily axially onto or off of the collet. The radius of the ring 15 is also slightly larger than the radial distance normally separating the collet axis from the portions 18 of the jaws 14. As a consequence, there normally is a radial clearance between the bore of the ring 15 and the portions of the jaws 14 surrounded thereby. This radial clearance is larger than the radial clearance that normally exists between the work 11 and the shoulders 17, so that the ring 15 will not prevent the jaws 14 from expanding radially far enough to engage the shoulders 17 with the bore wall of the work 11, when the collet is rotated by the machine spindle.

The collet of this invention is adapted to be used where the operation to be performed on a workpiece requires high speed rotation of the workpiece, as in grinding or polishing a workpiece.

In use, the axially bored workpiece 11, which is to be chucked, is slipped over the ring 15 and over the shoulders 17 until the inner end of the workpiece abuts shoulders 19. This is done either before or after the collet 10 has been mounted in the spindle of a machine, and before the spindle commences to rotate.

After the workpiece 11 has been mounted on the collet 10 and the collet has been mounted in the work spindle, the spindle is driven up to operating speed, with the result that the jaws 14 of the collet are urged radially outwardly by centrifugal force until shoulders 17 engage and grip the bore of the workpiece with sufficient force to secure the latter against movement on the collet. The desired work can then be performed on the workpiece. For instance it can then be polished or ground with an emery wheel. When the operation is completed, the spindle drive motor is stopped, thereby causing the collet 10 to stop rotating. The jaws 14 of the collet then retract radially back to their normal positions, so that the radial clearance is once again introduced between the workpiece and the shoulders 17. The workpiece may then be removed from the collet.

The ring or sleeve 15 will prevent excessive expansion of the jaws 14, should the collet be rotated without a workpiece thereon.

From the foregoing it will be apparent that the invention obviates the need for a drawbar and conical head of the type heretofore employed for expanding the jaws of a split collet grippingly to engage the bore of a surrounding workpiece or tool. This novel, centrifugally operated collet is therefore substantially more compact and less expensive than prior such collets.

The centrifugal force necessary to cause the desired expansion of the jaws 14 will depend upon the flexibility of the jaws, and can be altered, for example, by increasing or decreasing the size of the shoulders 19, and thereby the weight of the respective jaws 14.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set

Having thus described my invention, what I claim is:

1. The combination with a split collet having
    a rigid portion and
    a plurality of radially flexible jaws integral at one end with said rigid portion to be expansible by centrifugal force,
    each of said jaws having a gripping portion adjacent its outer, free end and a shoulder portion juxtaposed to its gripping portion and disposed rearwardly of its gripping portion,
    the gripping portions of said jaws in the normal collapsed positions of said jaws having an outside diameter slightly less than the inside diameter of the bore of a workpiece that is adapted to be chucked by said collet,
    the shoulder portions of said jaws in said normal collapsed positions of said jaws having an outside diameter greater than the diameter of the bore of the workpiece,
    whereby the workpiece may be slipped over the gripping portions of the collet jaws in their normal collapsed condition to be seated axially against the shoulder portions of said jaws, so that when said collet is rotated the jaws will be expanded and grip the workpiece, of
    a ring for limiting the expanding movement of said jaws, said ring having an outside diameter no greater than the outside diameter of the gripping portions of said jaws in their normal collapsed positions, and each of said jaws having a seating portion of reduced outside radius forwardly of its gripping portion, said seating portions having in the normal, collapsed positions of said jaws an outside diameter less than the inside diameter of said ring, whereby to form a shoulder at their junctures with the gripping portions of said jaws.

2. The combination as claimed in claim 1, wherein each of said seating portions has at its forward extremity an arcuate portion of larger outside radius than said seating portions, but of less outside radius than said gripping portions, so that said arcuate portions together form a detent to hold said ring on said seating portions.

3. The combination with a split collet having
    a cylindrical shank portion and
    a plurality of radially flexible jaws integral at one end with said shank portion to be expansible by centrifugal force,
    each of said jaws having an external, arcuate gripping portion adjacent its outer, free end and an external, arcuate shoulder portion juxtaposed to its gripping portion and disposed rearwardly of its gripping portion,
    the gripping portions of said jaws in the normal collapsed positions of said jaws having an outside diameter slightly less than the inside diameter of the bore of a workpiece that is adapted to be chucked by said collet, and
    the shoulder portions of said jaws in said normal collapsed positions of said jaws having an outside diameter greater than the diameter of the bore of the workpiece,
    whereby the workpiece may be slipped over the gripping portions of the collet jaws in their normal collapsed condition to be seated axially against the shoulder portions of said jaws, so that when said collet is rotated the jaws will be expanded and grip the workpiece, of
    a ring surrounding said jaws for limiting the expanding movement of said jaws,
    said ring being seated in axially registering arcuate recesses formed in said jaws intermediate the ends thereof, and
    the bottoms of said recesses in the normal collapsed positions of said jaws lying in a cylinder having a diameter less than the inside diameter of said ring.

References Cited

UNITED STATES PATENTS 2,431,961  12/1947  Phillips et al. _____ 279—2

FOREIGN PATENTS 113,110  12/1899  Germany.

ROBERT C. RIORDON, Primary Examiner

D. D. EVENSON, Assistant Examiner

U.S. Cl. X.R.

82—44